US011105279B2

(12) United States Patent
Koenen et al.

(10) Patent No.: US 11,105,279 B2
(45) Date of Patent: Aug. 31, 2021

(54) ON-DEMAND GENERATOR STARTING SYSTEM

(71) Applicant: Briggs & Stratton, LLC, Wauwatosa, WI (US)

(72) Inventors: Robert John Koenen, Pewaukee, WI (US); Jason A. Hansen, Elkhorn, WI (US); Dale C. VanPatten, West Allis, WI (US); Jeffrey Berger, Port Washington, WI (US); Philip Betzhold, Menomonee Falls, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 16/486,233

(22) PCT Filed: Feb. 19, 2018

(86) PCT No.: PCT/US2018/018622
§ 371 (c)(1),
(2) Date: Aug. 15, 2019

(87) PCT Pub. No.: WO2018/152466
PCT Pub. Date: Aug. 23, 2018

(65) Prior Publication Data
US 2020/0003134 A1 Jan. 2, 2020

Related U.S. Application Data

(60) Provisional application No. 62/460,381, filed on Feb. 17, 2017.

(51) Int. Cl.
*F02D 29/06* (2006.01)
*F02D 41/04* (2006.01)
(Continued)

(52) U.S. Cl.
CPC ........... *F02D 29/06* (2013.01); *F02D 41/042* (2013.01); *H02J 1/00* (2013.01); *H02J 1/082* (2020.01); *H02J 2207/40* (2020.01)

(58) Field of Classification Search
CPC ............................. F02D 29/06; F02D 41/042
(Continued)

(56) References Cited

U.S. PATENT DOCUMENTS 5,561,330 A 10/1996 Crook
6,075,459 A * 6/2000 Saarem ............... F02N 11/0807
123/179.2
(Continued)

OTHER PUBLICATIONS

International Search Report and Written Opinion for International Application No. PCT/US2018/018622 dated Apr. 27, 2018.

*Primary Examiner* — Erick R Solis
(74) *Attorney, Agent, or Firm* — Foley & Lardner LLP

(57) ABSTRACT

An on-demand generator starting system and method is disclosed. The generator starting system is included as part of a standby or portable generator that includes one or more outlets that provide electrical power to an electrical device. The operating system includes a generator controller that monitors for a request for power from the electrical device connected to the outlet. When the control circuit of the generator controller determines that electric power is required from the generator, the control circuit initiates operation of the internal combustion engine. After the internal combustion engine starts, the control circuit operates a relay to provide power from the generator to the outlet of the generator. When the electrical device is no longer operating, the control circuit of the generator controller terminates operation of the internal combustion engine of the generator. In this manner, the generator operates only when the electrical device is requesting electrical power.

18 Claims, 3 Drawing Sheets

(51) Int. Cl.
*H02J 1/00* (2006.01)
*H02J 1/08* (2006.01)

(58) Field of Classification Search
USPC .................. 290/30 R, 30 A, 30 B; 123/179.4
See application file for complete search history.

(56) References Cited

U.S. PATENT DOCUMENTS

| | | | |
|---|---|---|---|
| 6,166,525 A * | 12/2000 | Crook | F02N 11/0803 |
| | | | 290/30 B |
| 8,319,357 B2 * | 11/2012 | Usselman | H02J 7/32 |
| | | | 290/1 A |
| 8,627,797 B2 * | 1/2014 | Renner | B60P 3/14 |
| | | | 123/179.4 |
| 8,987,638 B2 * | 3/2015 | Hiroi | B23K 9/1043 |
| | | | 219/137 PS |
| 9,979,337 B2 * | 5/2018 | Iles | H02P 9/48 |
| 2011/0313584 A1 | 12/2011 | Carson | |
| 2012/0193988 A1 | 8/2012 | Eschrich et al. | |
| 2014/0319911 A1 | 10/2014 | Alexander | |

* cited by examiner

ON-DEMAND GENERATOR STARTING SYSTEM

CROSS REFERENCE TO RELATED APPLICATION

The present application is the U.S. national stage application of International Application No. PCT/US2018/018622 filed Feb. 19, 2018, which international application was published on Aug. 23, 2018, as International Publication No. WO 2018/152466 in the English language. The international application is based on and claims priority to U.S. Provisional Patent Application Ser. No. 62/460,381, filed Feb. 17, 2017, the disclosure of which is incorporated herein by reference.

BACKGROUND

The present disclosure generally relates to the operation of a generator. More specifically, the present disclosure relates to the operation of a generator on an on-demand basis.

Presently, standby generators and portable generators are used to supply power to electrical devices and appliances when the utility power is either interrupted or not available. Typically, both standby generators and portable generators include an internal combustion engine that is started and allowed to run to provide a supply of AC power to one or more electrical devices. The internal combustion engine of the generator continues to operate and consume fuel until the generator is turned off. During operation, the internal combustion engine both consumes fuel and creates noise, which may not be desirable, especially during times when the connected electrical devices are not consuming power a home or other location. Therefore, a desire exists for a standby or portable generator that operates only when necessary to reduce fuel consumption and the noise of operation.

SUMMARY

The present disclosure relates to a generator and an operating system for a generator that allows the generator to be operated on an on-demand basis. The method of operation allows the generator to operate only when there is a present demand for electric power from one or more electrical devices connected to one or more outlets of the generator.

The generator includes an internal combustion engine that can be operated to generate a supply of electric power. The supply of electric power from the generator is provided to an outlet that can receive a plug from an electric device and provide power to the electric device. The generator includes an operating system having a control unit contained within a generator controller. The control unit is operatively connected to a relay that has a movable contact that can selectively connect one of a pair of inputs to an output of the relay. The output of the relay is connected to the generator outlet. The position of the contact within the relay is controlled by the control circuit of the generator controller. In one embodiment, when the generator is not operating, the output of the relay is connected to the outlet of the generator. The outlet of the generator, in turn, receives a plug of the electric device. Typically, the electric device has an internal switch that is open when the electrical device is not operating. When the electric device is activated, such as through the depression of a trigger or on/off switch, the internal switch of the electric device closes. When the switch of the electric device closes, a connection path is created through the device between the terminals of the generator outlet. The connection path between the terminals of the outlet provides a ground potential at an input to the control circuit of the generator controller.

When the control circuit sees the ground potential, the control circuit determines the electric device is activated and the control circuit initiates starting of the internal combustion engine of the generator through a starter circuit. Once the internal combustion engine of the generator begins operation, the control circuit confirms such operation and, upon such confirmation, moves the internal contact of the relay to a second position. In the second position, the second input of the relay is connected to the output of the generator. The output of the generator is thus provided to the outlet, which in turn allows the electric device to operate.

During the continued operation of the electric device, the control circuit of the generator controller monitors the current drawn from the generator through the outlet. As long as current is being drawn, the control circuit can confirm continued operation of the electric device. If the current drawn from the generator stops or falls to a very low value, the control circuit determines that the electric device is no longer operating. If the electric device is no longer operating for longer than a pre-determined delay period, the control circuit determines that the operation of the generator can stop. To stop the generator, the control circuit first causes the internal contact of the relay to move back to the normally closed position in which the output of the generator is disconnected from the outlet. After the output of the generator is disconnected from the outlet, the control circuit stops the operation of the engine through use of an ignition kill circuit. In one embodiment of the present disclosure, the ignition kill circuit grounds the primary of the engine to terminate operation of the engine. In this manner, the control circuit of the generator controller is able to operate the engine of the generator on an on-demand basis such that the generator operates only when the source of electric power is needed.

In another embodiment of the present disclosure, a battery power supply and inverter are incorporated into the operating system to provide a small, constant supply of AC power to the electric device when the electric device is connected to the generator outlet. The small, constant supply of electric power from the battery and inverter is sufficient to power internal digital circuitry within the electric device. However, when a higher power circuit within the electric device begins operating, such as the compressor of a refrigerator, the control circuit senses the increase in current draw from the battery and inverter. Upon sensing the increase in current draw, the control circuit starts operation of the internal combustion engine of the generator and disconnects the battery and inverter from the generator outlet.

In the same manner as described above, when the current draw from the electric device falls below a threshold value, the control circuit again moves the internal contact of the relay away from the power supply of the generator back to the battery and inverter and terminates operation of the internal combustion engine.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
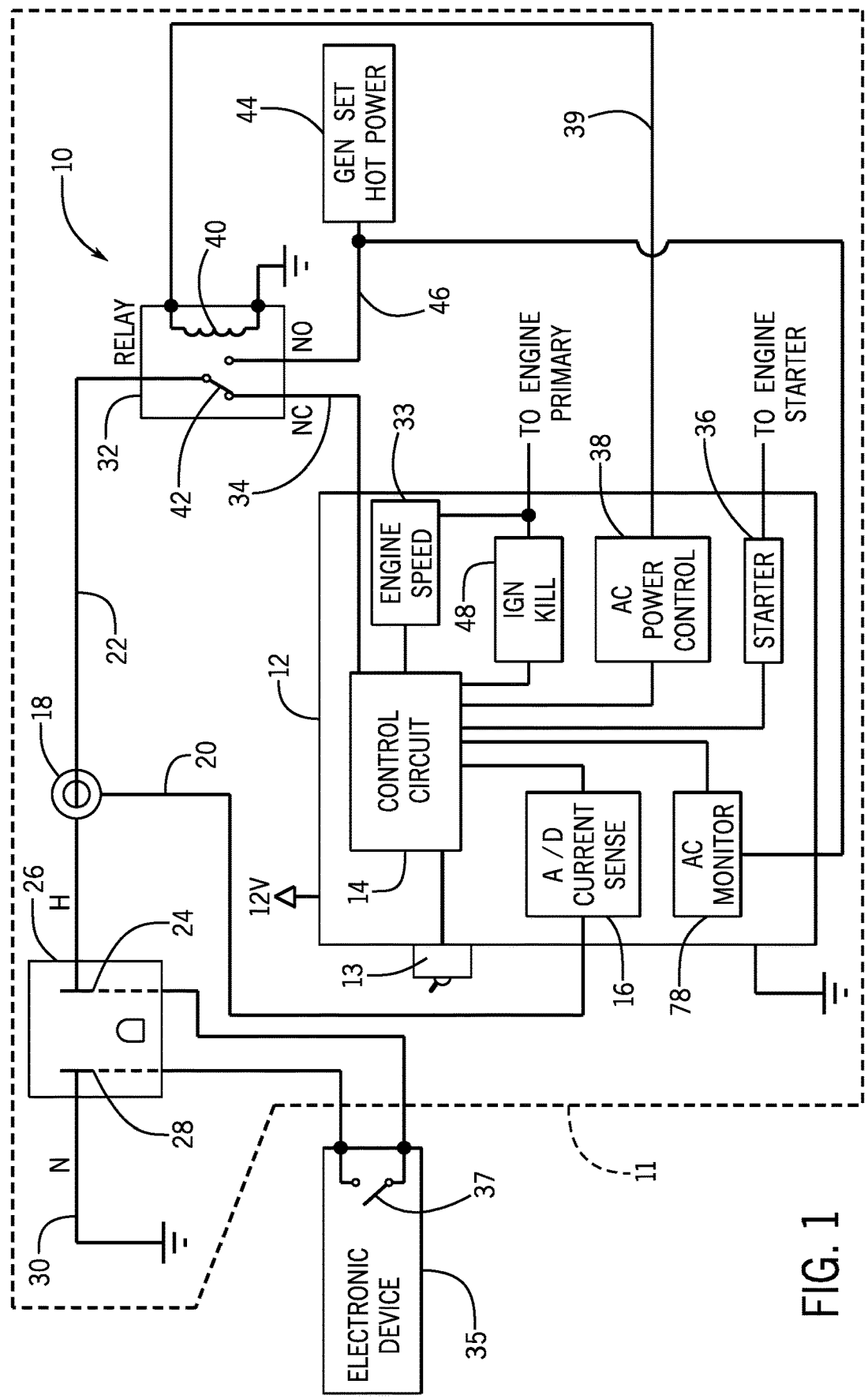
FIG. 1 is an electrical circuit schematic for the starting circuitry for on-demand operation of a generator.

FIG. 1 is a circuit schematic of an operating system 10 for use with either a standby generator or a portable generator 11 that includes an internal combustion engine. The operating system 10 is incorporated into the generator 11 and includes a generator controller 12 that includes a control circuit 14. The control circuit 14 could be a microprocessor or any other type of control unit that is able to carry out the functions shown and described below. It is contemplated that the generator controller 12 could include a switching device 13 to allow the owner/operator to select between an automatic mode, a manual mode or an off mode. The switching device 13 would be accessible on a control panel or outer housing of the generator 11. When the switching device 13 is in the manual mode, the generator 11 would turn on and stay on continuously either until the utility power returned or the generator is manually turned off. In the manual mode, the owner could press a momentary push button to allow the owner to crank over the engine. This is the typical mode of operation for standby and portable generators In one embodiment, when the switching device 13 is moved to the on-demand mode, the generator would turn on upon a loss of utility power and upon a call for power from an electrical device connected to the generator. In another embodiment in which the generator is not monitoring for the loss of utility power and is instead functioning as a remote source of electrical power, the generator will turn on upon a call for power from an electrical device connected to the generator. In an embodiment in which the generator is a portable generator, the on-demand mode would turn on the generator upon a demand for power from any device connected to an outlet 26 of the portable generator.

As shown in FIG. 1, the generator controller 12 includes an A/D current sensing circuit 16 that is connected to a current sensing donut 18 through a sensing line 20. The current sensing donut 18 surrounds a power supply line 22 that is connected to the hot or line contact 24 of the outlet 26 on the generator. The current sensing donut 18 creates an analog signal that is related to the amount of current flowing through the power supply line 22, which is converted to a digital signal by the A/D current sensing circuit 16 in the generator controller 12. The digital signal from the A/D current sensing circuit is provided to the control circuit 14 for monitoring as will be described below. Although a current sensing donut 18 is shown in the embodiment of FIG. 1, the current sensing donut 18 could be replaced with other types of current sensors, such as a toroidal donut, shunt resistor, Hall Effect sensor or other current sensing devices. The neutral contact 28 of the outlet 26 is connected to ground through line 30.

A switching device, such as relay 32, is included in the generator 11 and is connected between the generator controller 12 and the outlet 26. Although the switching device is shown in FIG. 1 as being the relay 32, the switching device could be other commercially available semiconductor switches, such as MOSFETs, IGBTs, transistors or other components. The switching device functions to selectively connect one of two inputs to an output of the switching device as will be described below. The relay 32 includes a normally closed line 34 that is connected back to the generator controller 12 and the control circuit 14. The control circuit 14 is able to monitor the status of the outlet 26 through the line 34.

In the embodiment shown in FIG. 1, an electrical device 35 is shown connected to the outlet 26 of the generator 11. The electrical device 35 could be any one of multiple different types of energy consuming loads that are desired to be powered by the generator 11. When the generator is a portable generator, the electrical device 35 can be operated at remote locations where a utility power supply may not otherwise be available. When generator 11 is a standby generator, the electrical device can be powered by the generator upon a loss of utility power.

When the electrical device 35 is connected to the outlet 26 and not operating, the electrical device 35 creates an open circuit between the pair of contacts 24, 28 within the outlet 26. However, when the electrical device 35 is operated, an operational switch 37 contained within the electrical device 35 is closed. The operation switch 37 is shown in FIG. 1 for illustrative purposes as being a simple contact that moves between open and closed positions. However, the switch 37 could be much different for different types of electrical devices 35. For example, if the electrical device 35 is an electric tool, such as a drill or saw, the switch 37 could be part of a trigger that when depressed, closes the switch contacts. In another example, if the electrical device 35 is a large appliance, such as a refrigerator, the switch 37 could close upon a demand for operation. In each case, when power is required by the electrical device, the switch 37 is closed, which creates a connection between the contacts 24 and 28, which then provides a ground through the outlet 26 and the line 30. This ground connection is then present on line 22, which can be sensed by the control circuit 14 through the contact 42 and the line 34.

When the control circuit 14 senses the ground connection created by the switch 37 closing, the control circuit 14 determines that the electrical device 35 needs power and that the internal combustion engine of the generator needs to start operating. Upon making this decision, the control circuit 14 sends a signal to the starter circuit 36, which in turn sends a signal to the starter of the internal combustion engine to begin cranking of the internal combustion engine of the generator.

Once the generator engine is up to speed and operating, the control circuit 14 confirms such operation by monitoring a signal from the engine speed sensing circuit 33. The engine speed sensing circuit 33 is connected to the engine primary and is able to determine the operating speed of the internal combustion engine. If the engine is operating, the control circuit 14 generates a signal that is received at an AC power control circuit 38. The AC power control circuit, in turn, supplies current along the output wire 39 to the relay winding 40 of the relay 32. This current flowing through the winding 40 creates a magnetic field that attracts the contact 42 and thus moves the contact 42 to the normally open position. When the contact is in the normally open position, the power supply line 22 is no longer connected directly to the control circuit 14. Instead, when the contact 42 is in the normally open position, power from the genset hot line 44 is connected to the outlet 26 through line 46, relay 32 and the power supply line 22. When the generator 11 is operating, the flow of current from the generator to the electrical device 35 is sensed by the donut 18 and the analog signal is converted by the A/D current sensing circuit 16 and relayed to the control circuit 14. In this manner, the control circuit 14 can monitor the draw of current by the electrical device 35 during operation of the generator. In addition, the engine controller includes an AC monitoring circuit 78 that can sense the AC power generated by the generator, which can then be monitored by the control circuit 14.

When the control circuit 14 determines that the electrical device 35 is no longer drawing current, such as when a trigger of the device 35 is released or when operation of the device is no longer needed causing the switch 37 to open, the control circuit 14 waits for a pre-determined period of time before taking action. This pre-determined delay allows for intermittent use of the electrical device 35 to occur without shutting off the generator. For example, the user may depress and release a trigger of a drill or saw intermittently during normal, continuous use. The pre-determined delay could be one or several minutes in which the device 35 is not demanding current.

After the expiration of the delay period, the control circuit 14 first disconnects power to the winding 40 of the relay 32. Once the contact 42 of the relay 32 returns to the normally closed position, the power generated by the generator 11 is no longer supplied to the outlet 26. Since operation of the generator is no longer needed or desired, the control circuit 14 generates a signal to the ignition kill circuit 48. The ignition kill circuit 48, in turn, generates a signal that causes the internal combustion engine to stop operating. This signal could be a ground connection for the primary of the engine, which would terminate operation of the internal combustion engine. In this manner, the generator controller 12 is able to initiate operation of the internal combustion engine of the generator upon a request for power from the electrical device connected to the outlet 26. Likewise, when current is no longer being drawn by the electrical device 35 through the outlet 26, the generator controller 12 can interrupt operation of the engine through the ignition kill circuit 48. In this manner, the operational system 10 can start and stop the generator based upon the demand for power by an electrical device.

Figure 2:
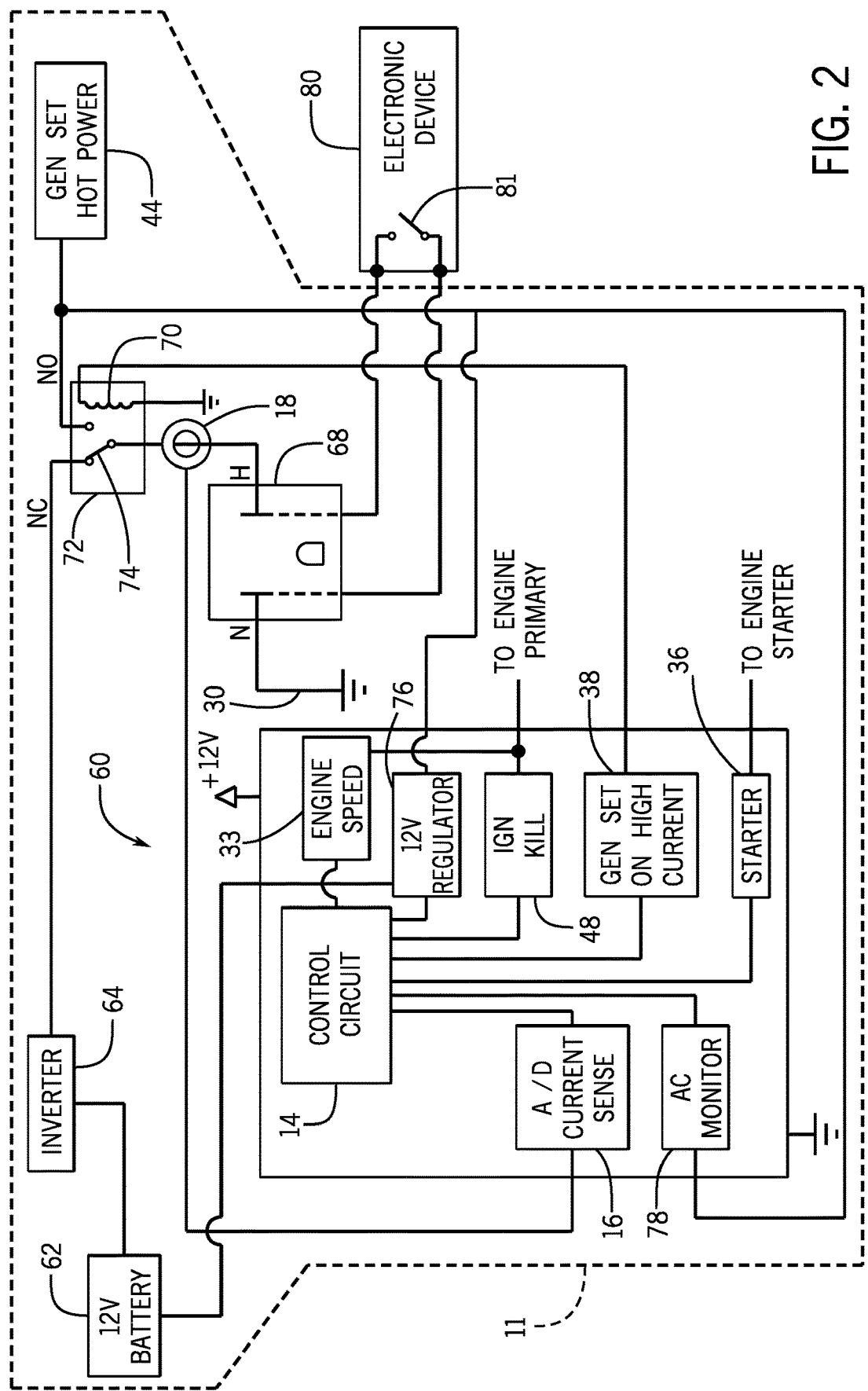
FIG. 2 is an alternate embodiment of the circuitry for an on-demand generator to support an electrical device having digital operating circuitry requiring constant power.

FIG. 2 illustrates an alternate embodiment of the generator operating system 60 that is particularly useful for powering electrical devices 80 that constantly draw a small amount of power to operate logic circuitry contained within the electrical device 80. As an example, modern refrigerators include a digital circuit that runs continuously. When the refrigerator needs to operate a higher power consuming compressor, the refrigerator draws an increased amount of power well above the amount of power needed to operate the digital circuitry. In order to operate such devices, the generator operating system 60 of the present disclosure includes a twelve volt storage battery 62 and a power inverter 64 that converts the twelve volt DC battery power supply into an AC power supply. The AC power supply from the inverter 64 is provided to the outlet 68 of the generator 11 through the supply line 73 that flows through the normally closed relay contact 74 of the relay 72.

The A/D current sensing circuit 16 contained within the generator controller 12 is again connected to the current sensing donut 18 or other equivalent current sensing device as described previously. When the electrical device 80 connected to the outlet 68 is operated, such as by closing a switch 81, the electrical device 80 draws a greatly increased amount of current from the battery 62, which is sensed at the control circuit 14 through the current sensing donut 18 or similar device.

When the control circuit 14 senses this increased demand for power, the control circuit 14 activates the starter circuit 36 to start the internal combustion engine of the generator. The control circuit 14 waits for the engine speed, which is sensed by the engine speed sensing circuit 33, to reach a running state before supplying current to the winding 70 of the relay 72 from the AC power control circuit 38. When current is supplied to the winding 70, the winding 70 moves the contact 74 from the normally closed position to the normally open position. In the normally open position, the contact 74 provides an electrical connection from the generator hot line 44 to the outlet 68. The generator hot line 44 is also connected to a twelve volt regulator 76 within the generator controller 12 and to an AC monitor 78. The AC monitor 78 monitors the current draw from the generator hot line 44 and relays this information to the control circuit 14. In this manner, the control circuit 14 is able to monitor current draw from the generator at the outlet 68.

The twelve volt regulator 76 is coupled to the battery 62 to recharge the battery 62 when the generator is operating. Since the twelve volt battery 62 is used to power the inverter 64 and the electrical device 80 connected to the outlet 68, the twelve volt battery 62 must be recharged in order to power the digital logic circuitry contained within the electrical device 80 connected to the outlet 68. It is contemplated that the control circuit 14 could monitor the charge on the battery 62 and if the power level of the battery 62 drops below a threshold value due to discharge to the inverter 64 and providing power to the outlet 68, the control circuit 14 could start the engine and recharge the battery. This function could also be triggered by a manual switching device.

When the control circuit 14 determines that the electrical device 80 connected to the outlet 68 is no longer drawing power and the pre-determined delay discussed above has expired, the control circuit 14 removes power from the winding 70, causing the contact 74 to return to the normally closed position. Additionally, the control circuit kills the ignition circuit for the internal combustion engine through the ignition kill circuit 48.

As can be understood in FIG. 2, the generator controller 12 is able to selectively activate and deactivate the internal combustion engine of the generator upon a request for power. In addition, the circuitry shown in FIG. 2 is able to provide a constant supply of power to digital circuitry contained within the electrical device 80 through the inverter 64 and battery power supply 62.

Although the embodiments shown in FIGS. 1 and 2 provide alternate configurations for the generator to supply power to an electrical outlet, it should be understood that the generator could include more than one outlet where one of the outlets would be controlled as shown in FIG. 1 where the second outlet would be controlled in the manner as discussed and described with reference to FIG. 2. In such an embodiment, the first outlet 26 would be used for electrical devices that do not need a constant supply of current to power internal circuitry while the second outlet 68 could be used to power electrical devices that include some type of constantly operating circuitry, such as a refrigerator. Alternatively, the generator could include multiple outlets of each type or combinations of the different types of outlets. In each case, the control circuit 14 of the engine controller 12 initiates operation of the internal combustion engine of the generator upon a request for power by one of the electrical devices connected to one or more of the electrical outlets.

When the generator controller 12 is used with a standby generator, the engine controller 12 would include a sensing device that monitors for the availability of the utility power supply. If the utility power supply is interrupted, the control circuit 14 would initiate the operation described above.

However, when the generator controller 12 is part of a standby generator, the generator would not be operated until there was a loss of utility power. Monitoring for the loss of utility power is a well known and standard function that is currently carried out by standby generators. The system and method of the present disclosure would utilize a standard system for monitoring the availability of the utility power supply and would begin operation and activation of the generator upon both the loss of utility power and a request for power by one of the electrical devices connected to one of the outlets.

Figure 3:
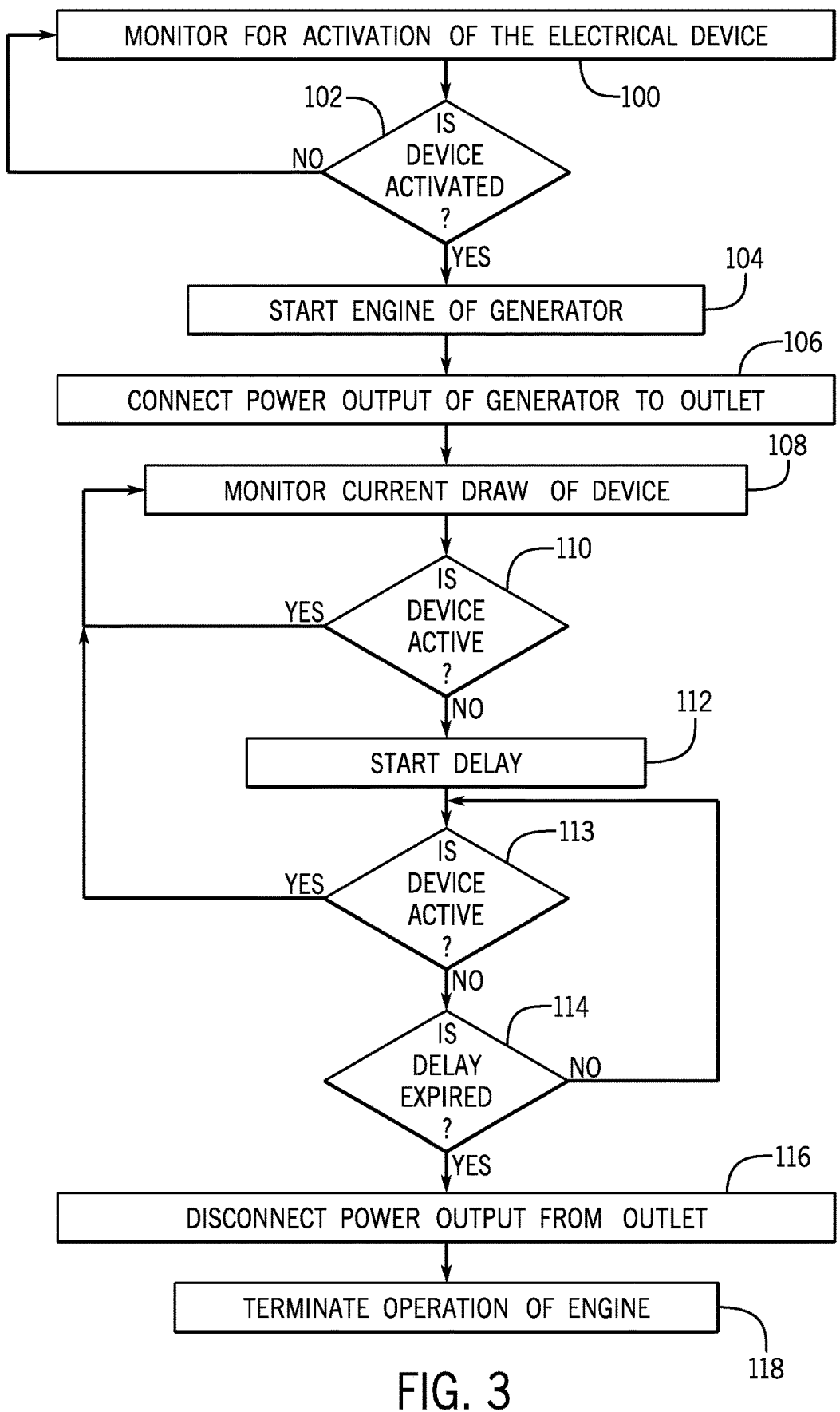
FIG. 3 is a flow chart illustrating the method of operating a generator in accordance with one embodiment of the present disclosure.

FIG. 3 generally illustrates the method carried out and performed by the operating system for the generator described with reference to FIGS. 1 and 2 above. As shown in FIG. 3, the operating system of the present disclosure initially starts operation after the electrical device 35 has been connected to the generator outlet 26 shown in FIG. 1. Once the electrical device has been connected to the outlet, the system monitors for activation of the electrical device in step 100. As described previously, when the electrical device 35 is not operating, a switch 37 in the electrical device 35 presents an open circuit that is sensed by the control circuit 14. However, when the electrical device is activated, switch 37 closes which connects the first input to the relay 32 to the control circuit 14 through the normally closed line 34. If the system determines in step 102 that the device has not been activated, the system returns to step 100 and continues to monitor for activation of the electrical device. Once the system determines in step 102 that the device has been activated, the system proceeds to step 104 and starts operation of the engine through the starter circuit 36. After the engine has been started, the system monitors for operation of the engine through sensing the engine speed and, once the control circuit 14 determines that the engine is indeed operating, the control circuit 14 causes the AC power control circuit 38 to supply current through the winding 40 of the relay, which connects the output power from the generator to the outlet as indicated in step 106.

While the power output of the generator is provided to the outlet, the power output of the generator will allow the electrical device 35 to operate. During this operation, the system monitors the current draw of the electrical device as indicated in step 108. In the embodiment shown in FIG. 1, the current draw of the device is monitored utilizing the combination of the current sensing device 18 and the A/D current sensing circuit 16. As long as the device remains active, the current draw will be sensed by the control circuit and the control circuit will determine that the device is active in step 110. If the system determines in step 110 that the device is no longer active, the system will begin a delay period. During the delay period, the system will continue to monitor for current draw by the electric device. If the system senses current draw from the generator in step 113, the device is again active and the system returns back to step 108.

If the device is still not active, the system will continue to monitor for current draw by the electric device and this process will continue until the delay period expires as indicated in step 114. Once the delay in step 114 expires, the system disconnects the power output from the generator by again moving the contact 42 of the relay 32 to the normally closed position. This movement is controlled by the control circuit 14 through the AC power control circuit 38 and is indicated in step 116.

After the power output from the generator has been disconnected from the outlet, the system terminates operation of the engine in step 118 and again returns to step 100 to monitor for activation of the electrical device.

As described above, the method of FIG. 3 is specifically applicable to the embodiment shown in FIG. 1. However, if the ultimate embodiment of the generator operating system 60 shown in FIG. 2 is utilized, the step for monitoring the activation of the electrical device shown in step 100 is slightly modified. As discussed previously, the system monitors for the current draw of the electrical device 80 through the outlet 68 through the current sensing donut 18. When the electrical device is activated, the amount of current draw from the battery 62 through the inverter 64 will increase and exceed a threshold value. When the current exceeds the threshold value, the control circuit 14 determines in step 102 that the electrical device has been activated. The remaining operation of the system will then follow the method steps illustrated in FIG. 3.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An operating system for a generator having an outlet and an internal combustion engine operable to generate a supply of electrical power to an electrical device connected to the outlet, the system comprising:
    a control unit powered by a DC battery, wherein the DC battery is a rechargeable twelve volt DC battery;
    a switching device selectively operable by the control unit to connect one of a first input or a second input to an output, wherein the second input receives the supply of electrical power from the internal combustion engine;
    an inverter positioned between the DC battery and the first input, wherein the DC battery supplies electrical power to the electrical device when a movable contact of the switching device connects the output to the first input;
    an outlet connected to the output through a power supply line;
    a current sensing device positioned to detect current flow through the power supply line and communicate to the control circuit;
    a starter circuit connected to the control unit and operable to initiate starting of the internal combustion engine;
    a power control circuit connected to the control unit and operable to switch the movable contact of the switching device to selectively connect the output to either the first input or the second input; and
    an ignition kill circuit connected to the control unit and operable to terminate operation of the internal combustion engine;
    wherein when the movable contact of the switching device connects the second input to the output, the DC battery is disconnected from the output.

2. The operating system of claim 1 wherein the outlet includes a first contact connected to the output and a second contact connected to ground, wherein the control unit detects ground potential as a request for power from the electrical device.

3. The operating system of claim 1 further comprising a selection switch in communication with the control circuit, wherein the selection switch is operable between an automatic mode and a manual mode of operation.

4. The operating system of claim 1 wherein the control unit switches the movable contact of the switching device to connect the second input to the output when the detected current flow exceeds a threshold level.

5. The operating system of claim 1 further comprising a twelve volt voltage regulator selectively connected to the DC battery to charge the DC battery from the internal combustion engine when the internal combustion engine is operating.

6. A generator capable of being operated to supply electrical power to an electrical device on an on-demand basis, the generator comprising:
   an internal combustion engine operable to generate a supply of electrical power;
   an outlet configured to provide electrical power to the electrical device when the electrical device is connected to the outlet;
   a control unit powered by a DC battery, wherein the DC battery is a rechargeable twelve volt DC battery;
   a switching device selectively operable by the control unit to connect one of a first input or a second input to an output, wherein a second input receives the supply of electrical power from the internal combustion engine, wherein the control unit detects a request for power from the electrical device;
   an inverter positioned between the DC battery and the first input, wherein the DC battery supplies electrical power to the electrical device when a movable contact of the switching device connects the output to the first input;
   a current sensing device positioned to detect current flow through a power supply line connected between the output and the outlet and communicate to the control circuit;
   a starter circuit connected to the control unit and operable to initiate starting of the internal combustion engine;
   a power control circuit connected to the control unit and operable to selectively connect the output to either the first input or the second input; and
   an ignition kill circuit connected to the control unit and operable to terminate operation of the internal combustion engine;
   wherein when the movable contact of the switching device connects the second input to the output, the DC battery is disconnected from the output.

7. The generator of claim 6 wherein the outlet includes a first contact connected to the output and a second contact connected to ground, wherein the control unit is connected to the first input and detects ground through the switching device and the outlet as the request for power from the electrical device.

8. The operating system of claim 6 further comprising a selection switch in communication with the control circuit, wherein the selection switch is operable between an automatic mode and a manual mode of operation.

9. The operating system of claim 6 wherein the switching device is a relay, wherein the control unit switches the movable contact of the relay to connect the second input to the output when the detected current flow exceeds a threshold level.

10. The operating system of 6 further comprising a voltage regulator selectively connected to the DC battery to charge the DC battery from the internal combustion engine.

11. A method of operating a generator having an outlet and an internal combustion engine on an on-demand basis, the method comprising the steps of:
   connecting an electrical device to the outlet of the generator;
   monitoring for the activation of the electrical device in a control unit of the generator, the control unit being powered by a DC battery, wherein the DC battery is a rechargeable twelve volt DC battery;
   initiating the operation of the internal combustion engine upon activation of the electrical device;
   disconnecting the power output from the DC battery from the outlet to electrically decouple the DC battery and an inverter from the outlet;
   connecting the power output of the internal combustion engine to the outlet to provide the power output to the electrical device;
   monitoring for the deactivation of the electrical device in the control unit; and
   terminating the operation of the internal combustion engine upon deactivation of the electrical device.

12. The method of claim 11 further comprising the step of selecting operation of the generator in a manual mode or an on-demand mode.

13. The method of claim 11 further comprising the steps of:
   connecting the DC battery to an inverter; and
   connecting the AC output of the inverter to the outlet.

14. The method of claim 13 further comprising the steps of:
   monitoring the amount of current drawn from the inverter by the electrical device; and
   initiating operation of the internal combustion engine when the amount of current drawn from the inverter exceeds a threshold value.

15. The method of claim 11 further comprising the step of disconnecting the power output of the internal combustion engine from the outlet upon detection of deactivation of the electrical load prior to terminating operation of the internal combustion engine and connecting the power output of the DC battery to the outlet.

16. The method of claim 11 wherein the activation of the electrical device is indicated by a ground potential received by the control unit.

17. The method of claim 11 wherein deactivation of the electrical device includes monitoring the current draw of the electrical device.

18. The method of claim 11 wherein the operation of the internal combustion engine is terminated after a pre-determined delay from deactivation of the electrical device.

* * * * *